UNITED STATES PATENT OFFICE.

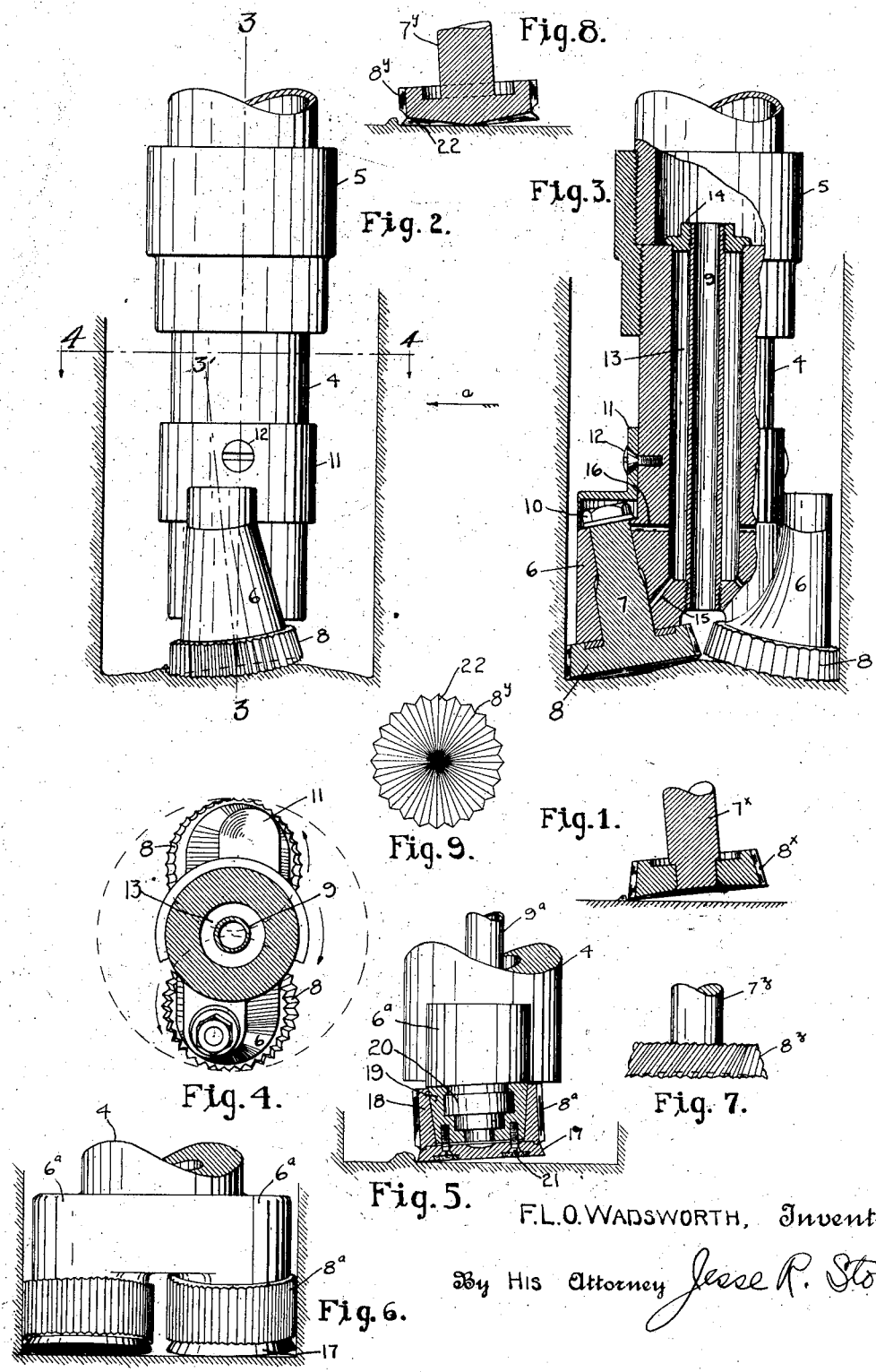

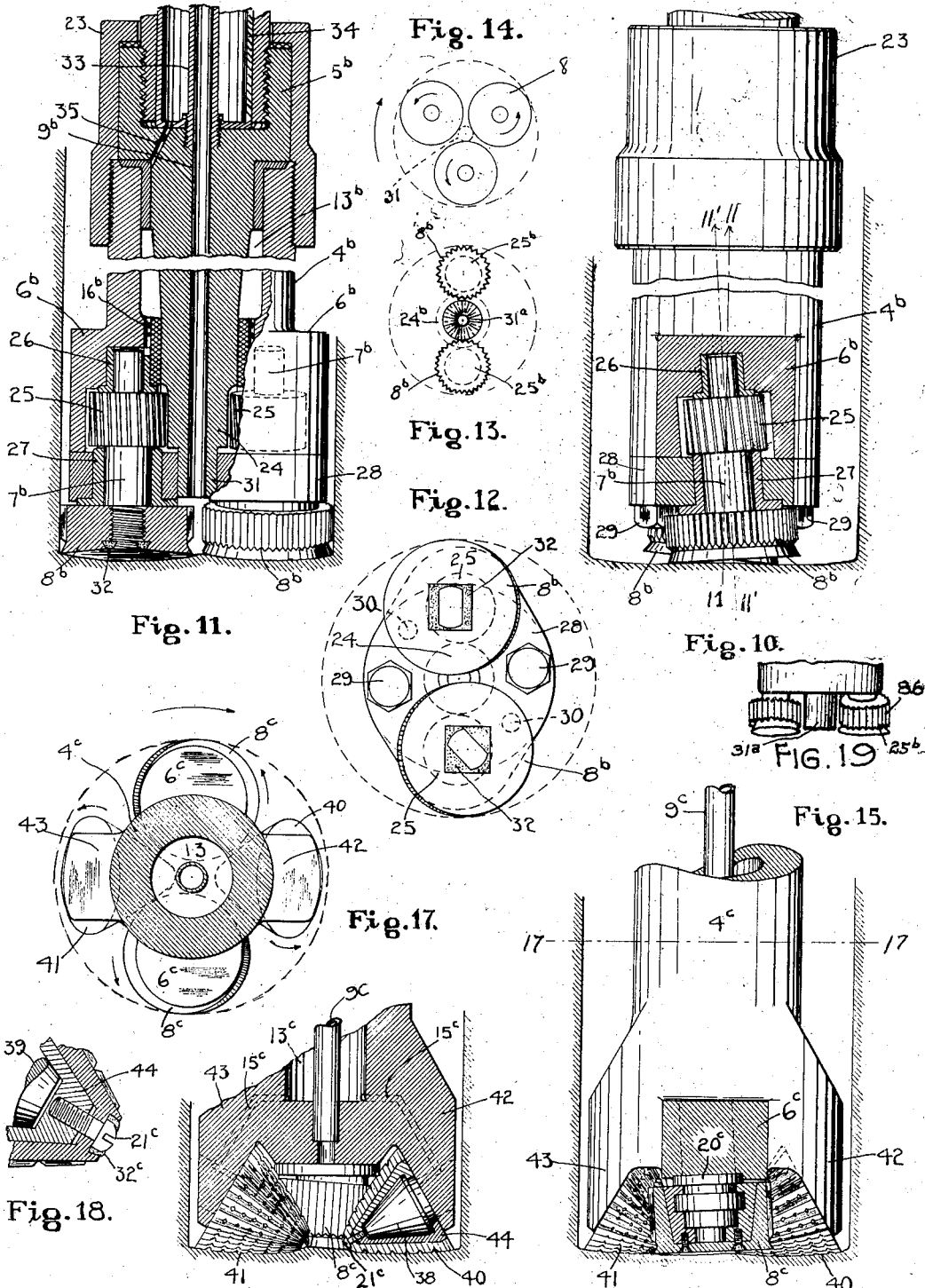

FRANK L. O. WADSWORTH, OF PITTSBURGH, PENNSYLVANIA.

ROTARY BORING-DRILL.

1,338,601.   Specification of Letters Patent.   Patented Apr. 27, 1920.

Application filed February 6, 1918. Serial No. 215,589.

*To all whom it may concern:*

Be it known that I, FRANK L. O. WADSWORTH, a citizen of the United States, residing at Pittsburgh, Pennsylvania, have invented a certain new and useful Improvement in Rotary Boring-Drills, of which the following is a full, clear, and exact description, such as will enable others skilled in the art to which it appertains to make and use the same.

My invention relates to boring drills of the rotary type for use in boring in earth, rock, etc. In general the forms of structure herein shown and described are designed and adapted to bore vertical, or horizontal or inclined holes—for oil, or gas, or water wells, or for tunneling or mining or exploring purposes—by the rotary action of a drill head which is secured at its upper or rear end to a hollow revolving drill stem and is provided at its lower or forward end with rotatably mounted disk shaped members that perform the drilling operation. The material that is cut away and disintegrated by the drill is washed away from the cutting members and carried to the upper end of the hole by a stream of flushing water introduced under pressure through the hollow drill stem and through channels in the drill head secured thereto. Such structures are generally designated by the term "rotary drill bits"; and have within recent years come into extended commercial use.

My invention particularly relates to a new type of rotary disk bit in which the disk members are revolubly mounted on axes that are substantially, or nearly, parallel to the axis of rotation of the drill head, as distinguished from the ordinary type of rotary disk bit in which the disk members are mounted on axes transverse to the said axis of rotation; and one of the primary objects of my invention is to produce a disk bit structure which will form a bore hole with a substantially flat bottom, instead of one with a semi-spherical or cup-shaped bottom. Another object of my invention is to provide rotating disk members of such form and arrangement as to remove the material from the flat bottom of the hole by the shearing action of sharp lower edges on the said members; simultaneously smooth and finish the sides of the hole to the desired diameter by the reaming action of suitably shaped peripheral edges or faces on the revolving disks; and concurrently disintegrate and pulverize any large particles of excavated material by a crushing and milling action of the lower and edge faces of the cutting and reaming elements. Another object of my improved construction is to provide disk members whose cutting and reaming edges will effectively resists wear, and will, therefore, maintain the "gage" of the bore hole for long continued periods of operation. Still another object of the invention is to produce a very simple, strong and durable rotary bit that will be well adapted to drill holes in widely different character of both hard and soft formations without any change of the cutter elements; and which will automatically adjust its rate of feeding and cutting action in accordance with the resistance of the material being operated upon. Further objects and advantages of the various forms of illustrative embodiments of my invention that are herein shown will be apparent to those skilled in the art from the more extended description which follows—like numerals being used as far as possible to indicate corresponding parts of each of the several views.

Figure 1 is an axial section through one of the cutters of the horizontal disk type of construction illustrating the action of the disk in shearing the material from the bottom of the drill hole. Fig. 2 is a vertical elevation of a drill head equipped with a modification of this type of cutting disk. Fig. 3 is a broken sectional elevation the head being broken on the vertical plane 3—3 and the cutter on the inclined plane 3'—3' (the view being taken in the direction of the arrow *a*) of Fig. 2. Fig. 4 is a plan sectional view on the plane IV—IV of Fig. 2, looking in the direction of the arrows. Fig. 5 is a side elevation of a modified form of horizontal disk cutter, similar to Fig. 2, except that it shows one of the cutters in section. Fig. 6 is a vertical elevation—taken at right angles to the view of Fig. 5—of this second embodiment. Fig. 7 is a side elevation of a modified form of horizontal disk cutter. Figs. 8 and 9 are, respectively, a sectional elevation and a bottom plan view of another form of disk member suitable for use in drills of the type shown in Figs. 5 and 6. Fig. 10 is a partial sectional side view—similar to Fig. 5—of a third form of horizontal disk rotary bit that embodies my invention. Fig. 11 is a broken sectional elevation—the head being broken partly on the central vertical plane 11—11, and the cutter on the inclined plane 11'—11' of Fig. 10; Fig. 12 is an end view (from below) of the drill bit shown in Figs. 10 and 11; Figs. 13 and 14 are plan views showing two modified arrangements of disk cutters on the drill head. Fig. 15 is a partial sectional elevation—similar to Figs. 5 and 10—of a rotary "cone bit" construction embodying my improvements. Fig. 16 is another partial sectional elevation—on the central plane of the drill head—of the form of structure shown in Fig. 15. Fig. 17 is a plan sectional view on and below the plane 17—17 of Fig. 15; Fig. 18 is a detail sectional view of part of one of the "cone bit rollers" of the Fig. 15—16 construction and Fig. 19 is a broken side view showing the position of the cutters illustrated in Fig. 13.

Referring now particularly to the construction illustrated in Figs. 1 to 4 of the drawings: 4 indicates the drill head which is threaded at its upper end for attachment to the drill collar, 5, and which is provided at its lower end with two diametrically opposite bosses, 6, 6, that are bored to receive the stud shaft supports, 7, of the disk members, 8, 8. The head is designed to revolve in a clockwise direction—as indicated in Fig. 4—and the shaft supports of the disk members, 8, slightly inclined forwardly (as indicated in Figs. 1 and 2) so as to bring the lower front edges of the disk members, 8, into cutting engagement with the material at the bottom of the bore hole, as indicated in Figs. 1 and 2. The disk members, 8, 8, are of frusto-conical form and the shaft supports for these members are also inclined outwardly—as indicated in Fig. 3—at such an angle as to bring the outer portion of the peripheral surfaces of these disks into substantial parallelism with the side wall of the bore hole; and thereby enable these outer peripheral faces, which are preferably provided with longitudinally extending teeth, to act as cutting and reaming elements for shaping and smoothing the sides of the bore hole to the desired gage diameter. As the drill head rotates in a clockwise direction the disk members, 8, 8, will be revolved in a counter clockwise direction, in part by the greater cutting resistance encountered by the outer portions of the lower cutting edges—which remove about three-fourths of the material from the bottom of the bore hole—and in part by the engagement of the toothed peripheral surfaces of the said members with the vertical walls of the bore hole. This revolution of the disk members on their own axes successively brings all portions of the lower cutting edges and of the peripheral toothed faces of the said members into engagement with the material; and by this simultaneous rotation of the drill head as a whole, and of each disk member on its own individual axis, a substantially flat bottomed hole with smooth finished side walls is produced. The material which is continuously cut away from the bottom of the hole is ground up and reduced to a fine state of subdivision, in part by the rubbing action of the lower faces of the disk members against the bottom of the bore cavity, and in part by the rolling engagement of the peripheral faces of the disks with the side walls of the cavity; and the finely divided material is then carried away in suspension in a current of water which is introduced under pressure through the hollow interior of the drill stem, and is discharged at the lower end of the drill head through a central opening, 9, leading from the top to the bottom of the head, 4.

The shaft support, 7, and the disk members, 8, may be made integral—as indicated at the left of Fig. 3—or may be made in two parts that are rigidly secured together, as indicated in Fig. 1. The disk members and shaft supports are held in position on the head, 4, by means of nuts, 10, that engage with reduced threaded portions at the upper ends of the shaft support, 7; and these upper portions of the shaft supports are preferably covered and protected by a sliding cap 11, which is secured in place on the head by screws, 12. The central portion of the head, surrounding the water delivery pipe, 9, is hollowed out to form a lubricating chamber, 13, which is closed at the top by a suitable screw cap, 14, preferably having a threaded connection with the pipe, 9, and which is provided at its lower end with branch passages, 15, 16, that serve to supply lubricant to the bearings of the shaft supports, 7.

The angle of inclination between the axes of revolution of the disk members, 8, and the axis of rotation of the drill head depends upon the cross-sectional form of the members, 8. As already stated, these members are preferably inclined forwardly at a slight angle, so as to provide a clearance or "back-rake" between the lower faces of these members and the bottom of the bore hole; and this clearance or back-rake can be increased, if desired, by concaving or dishing the said lower faces of the disk members in the manner shown in Fig. 1. In some cases this forward inclination of the cutting disks may be dispensed with and the desired clearance between the advancing cutting edges of the disk members and the bottom of the bore cavity may be secured only by the dishing or concaving of the lower face. In such cases the teeth of the side peripheral faces of the disk members will be preferably inclined backwardly as indicated in Fig. 7; this backward upward inclination of the teeth serving to hold the disk members in cutting engagement with the bottom of the bore hole by the reaction between the inclined edges of the teeth and the side wall of the cavity.

In the construction shown in Figs. 5, 6, 8 and 9 the outward inclination of the axes of the disk members is rendered unnecessary by making the peripheral faces of the said members of cylindrical, instead of frusto-conical form. In such a case the outer peripheral toothed surfaces of the members will make contact with the side wall of the bore hole over substantially the entire width of the cylindrical disk surface as indicated in Fig. 6. In the form of construction indicated in Fig. 5 the disk members $8^a$ are formed in two parts, viz: A lower plate element, 17, which is provided with a beveled edge that shears the material from the bottom of the bore hole, and an upper cylindrical sleeve, 18, which is provided with teeth on its periphery, and which acts as the reaming element for smoothing and finishing the side walls of the bore hole. The inner surface of this sleeve, 18, is coned to fit the outer surface of a split bushing, 19, that engages with a fixed stud shaft support, 20, on which the disk member revolves. In assembling the parts in place the split bushing, 19, is first engaged with the shouldered stud, 20, and the disk members, 17, and 18, are then clamped in position on the bushing, 19, by the screws, 21, 21. In order to prevent any accidental separation of the parts—which would permit the disk members to be disengaged from the drill head when the latter was lifted out of engagement from the bottom of the hole—the counter sunk recesses in which the heads of the screws, 21, 21, engage may be undercut above the heads of the screws and these undercut portions filled with lead or Babbitt metal after the screws are in place. In order to remove the screws this lead or Babbitt metal is melted out by the local application of heat of a gasolene torch, or by any other suitable means—the amount of heat required for this purpose being insufficient to draw the temper of the steel cutting disks. The shouldered shaft supports, 20, may be made integral with the drill head, 4, or they may be formed as separate pieces which are rigidly secured in the bosses, $6^a$, on the said head. The disk members, $8^a$, may also be made in one integral piece (see for example Fig. 15) instead of in two pieces, 17, 18, as shown in Fig. 5.

Figs. 8 and 9 illustrate a modification of the form of cylindrical disk cutter last described. In this modification the disk members and the shaft supports therefor are made in one integral piece, and the supports are revolubly mounted in the bosses, $6^a$, of the drill head in the manner illustrated in Fig. 3. These disk members are also provided on their lower faces with radial tapered teeth, 22; and the inclination of the disk axis is such that the said teeth, 22, make engagement with the bottom of the bore hole over substantially the entire advancing semi-circular area of the lower face of the disk member. The purpose of this arrangement is to increase the grinding and milling action of the lower revolving faces of the disk on the material at the bottom of the bore hole, and thereby facilitate its more rapid pulverization and subsequent removal in suspension in the stream of flushing water.

In the construction illustrated in Figs. 10, 11 and 12, the drill head, $4^b$, is not secured directly to the lower end of the drill stem collar, $5^b$, but is mounted so as to revolve axially thereon; and is held in position against longitudinal displacement by means of a shouldered collar, 23, that is threaded on the upper end of the drill head, $4^b$, and engages with the rear end of the drill stem collar, $5^b$. The drill stem collar, $5^b$, is extended downwardly to the lower end of the drill head, and is provided near its lower end with a spur gear, 24, that engages with cross spur gears, 25, that are secured on the shaft supports, $7^b$, of the horizontal disk cutters, $8^b$. The shaft supports, $7^b$, are carried, at their upper ends, in bushings, 26, that are inserted in the bosses, $6^b$, $6^b$, and at their lower ends, in bushings, 27, that are inserted in the plate, 28, which is secured to the lower end of the drill head by heavy stud bolts, 29, 29 and dowel pins, 30, 30. The plate, 28, is also provided with a central bearing to receive the lower end, 31, of the extended drill stem collar, $5^b$. The disk cutter members, $8^b$, are threaded on the lower ends of their shaft supports, and are locked in position thereon by means of lead or Babbitt metal seals, which are cast into the recesses, 32, between the squared cavities on the lower faces of the disk members, and the flattened undercut ends of the shaft members (see Figs. 11 and 12).

The collar, $5^b$, is provided with a central hole, $9^b$, and a pipe, 33, extending upwardly into the interior of the drill stem, is threaded into the upper end of this hole. A tubular lubricator cup, 34, surrounds the pipe, 33, and is threaded on the lower end of the latter. This cup is closed at the upper end by a suitable cap—similar to the cap, 14, of Fig. 3—which is not here shown. Suitable passage ways, 35, are provided to conduct the lubricant from the cup, 34, to the upper bearing between the member, $5^b$, and the drill head, $4^b$; and from this bearing the lubricant first flows downwardly into the chamber, $13^b$; thence, through the passages, 16ᵇ, into the upper bearings of the disk shaft supports, 7ᵇ; and then down, through the closed chamber surrounding the gears, 24—25—25, to the lower bearings (for the shafts, 7ᵇ, and the extension, 31, of the rotating drill stem collar) in the plate, 28.

The operation of the last described drill structure is as follows:

When the drill stem is set in rotation, the movement is first communicated to the member, 5ᵇ, which in turn communicates a positive rotation to the disk members, 8ᵇ, 8ᵇ, through the medium of the intermeshing cross spur gears, 24—25—25. The positive rotation of the members 8ᵇ, 8ᵇ—in counter clockwise direction—causes these members to roll forward, in a clockwise direction, by reason of the frictional engagement of the outermost portions of the lower cutting edges and of the peripheral reaming edges with the material at the bottom and the adjacent side walls of the bore cavity. The drill head, 4ᵇ, and the cutting-crushing-reaming disks, 8ᵇ, 8ᵇ, therefore, rotate in the same direction as the drill stem, but at a reduced speed; and the ratio of these differential rotary movements may be varied and controlled, within quite wide limits, by varying the ratio between the pitch diameters of the cross gears, 24—25—25, and by also varying the ratio between these diameters and the peripheral diameter of the revolving disk members, 8ᵇ.

Fig. 13, which, like Fig. 12, is a bottom view of a drill bit, illustrates diagrammatically a modification of the construction shown in detail in Figs. 10–12. In this modification the disk members, 8ᵇ 8ᵇ, are made of a peripheral diameter which is considerably less than the radius of the hole which the drill is designed to bore, and the lower end, 31, of the rotating drill stem member, 5ᵇ, is enlarged and extended downwardly to the level of the cutting edges of the disk members, 8ᵇ 8ᵇ. The lower end of this extension is preferably provided with radially or spirally cut teeth to form an end mill cutter, 31ª, which will act to cut away and disintegrate the material at the central portion of the bore hole bottom; and the peripheral faces of the extension may be either provided with teeth—like the disk members, 8ᵇ—or left smooth. In either case, the narrow spaces between the contiguous peripheral surfaces of the members, 31ª, and the members, 8ᵇ 8ᵇ constitute roll passes that will assist in crushing and disintegrating the loose material at the bottom of the cavity and in facilitating its mixture with, and suspension in, the flushing stream of water which is delivered downwardly through the pipe, 33, and the opening, 9ᵇ.

This modification also illustrates a variation in the relative sizes of the gears, 24ᵇ and 25ᵇ—indicated in Fig. 13 in dotted lines—such as was referred to in a preceding paragraph. Fig. 14 shows diagrammatically another arrangement of the cutters. Three cutters are here shown, and the relative sizes of the cutters and of the portion, 31, of the drill collar are varied to produce a slower positive rotation of the cutters.

In the construction illustrated in Figs. 15 to 18 the two disk members, 8ᶜ 8ᶜ, are similar in form to those shown in Figs. 5–6; and are revolubly mounted and secured on the shouldered studs, 20ᶜ, in substantially the same manner as was described in detail in the explanation of those figures. In addition to the two horizontal disk members, 8ᶜ 8ᶜ, this drill bit is further provided with two "cone bit" rollers, 40 and 41, which are mounted on inclined stud shafts, 38 and 39, that are secured in the outwardly and downwardly extending drill head projections, 42 and 43. These "cone bit" rollers are revolubly secured on the shouldered studs, 38 and 39, in the same manner as the disk members, 8ª and 8ᶜ, are secured on their shaft supports; i. e., by providing a two part bushing, 44, which is first put in place over the shouldered stud and then clamped in position against the coned interior of the roller by means of a screw, 21ᶜ, that is itself locked against unscrewing by a fusible metal seal, 32ᶜ (see detail of Fig. 18). The outer frusto-conical surfaces of the members, 40 and 41, are slightly curved longitudinally to correspond with the surface of revolution described by the lower cutting edges of the disk members, 8ᶜ; and these surfaces are preferably provided with a crossed series of longitudinally and circumferentially cut grooves that form toothed projections of the same character as those described in the Hughes "cone bit" patents (Nos. 979,496 or 1,143,271 for example). Lubricant is continuously supplied to the bearing surfaces of the stud shafts, 20ᶜ, 38 and 39 through suitable passage ways (as 15ᶜ, 15ᶜ, etc.) leading from a central lubricator chamber, 13ᶜ; and a central water conduit, 9ᶜ is likewise provided for conducting a stream of flushing fluid from the interior of the hollow drill stem to the bottom of the drill head— the arrangement of the last enumerated parts being substantially the same as that shown in greater detail in Fig. 3.

In the operation of the combined horizontal-disk-cone bit construction just described, the material is removed in part by the chipping action of the teeth on the cone rollers and in part by the shearing action of the lower cutting edges of the horizontal disk members; and the concurrent crushing and disintegrating of the cut away material is effected by the joint rolling and end milling action of both sets of revolving members. An inspection of the plan view of Fig. 17 shows that the interposition of the "cone rollers" between the horizontal disk members, does not necessitate any substantial reduction in the effective cutting diameter of the latter; and the addition of the rolling cone bit elements, therefore, not only increases the rapidity of the boring action of the drill, but also results in a distribution of the inevitable wear over a larger number of cutting elements and thereby prolongs the effective "life" of those parts. This combination of horizontal disk-cutting-crushing-reaming members and of cone bit roller elements is also very useful and advantageous in drilling "mixed" formations consisting of shales and conglomerates or in general or alternating strata of relatively soft and relatively hard material. For as is well known, a "cone roller" bit is exceedingly efficient and effective in drilling hard rock, but is not nearly so well adapted for operation in soft material; while a disk drill, on the other hand, operates very rapidly and effectively in the softer strata, but much less efficiently in the harder formations.

In the constructions above described the drill is centered and steadied in its operation by the engagement between the outer peripheral faces of the horizontal disk members and the adjacent sides of the bore hole; and conversely—in drilling through very soft and unstable formations (such as require "slushing" to prevent caving)—the side walls are prevented from collapsing and the material forming them is compressed and packed tightly together by the rolling and smoothing action of the vertical peripheral faces of the said members. This advantage is one that is peculiarly characteristic and typical of the horizontal disk drill type of construction herein disclosed; and in referring to this type I use the term "horizontal disk" to indicate in general a revolving cutting-crushing member of substantial thickness or axial length which is so shaped and positioned as to present an outer peripheral face that is substantially parallel to the axis of rotation of the drill head on which this disk member is mounted; and which is, therefore, substantially parallel to the side wall of the bore hole cut by the drill members. In general, such disk members will revolve on axes that are nearly parallel to the axis of rotation of the drill: and in this sense the "horizontal" disk axes are substantially vertical—in vertical drilling—or are substantially parallel with the drill head axis.

With these characteristics of structure and of functional operation in mind—and of the embodiments of the invention with the embodiments of the invention herein disclosed as guides—it will be easy for those skilled in the art to devise various other specific forms of "horizontal disk" drill constructions. But I believe I am the first to devise and develop this general type of rotary bit structure and what I claim, therefore, is:

1. A rotary drill bit comprising a head, and two disk cutters almost, but not quite horizontal rotatably mounted on the forward end thereof; the said cutters having lower slightly inclined end cutting and disintegrating faces adapted to dig the entire bottom of the hole and peripheral surfaces so arranged as to make contact with the wall of the hole over substantially their entire width.

2. A rotary drill bit comprising a head and symmetrically disposed cutting disks on the forward end thereof; the said disks being mounted on axes that are almost but not quite parallel with the longitudinal axis of the head and presenting forward shearing-edges and peripheral cutting surfaces that are substantially parallel to the wall of the hole being bored.

3. A rotary drill bit comprising a head, and a plurality of disk members almost but not quite horizontal rotatably mounted on the forward end thereof; each of the said members having a sharp cutting edge on its end face to shear away the material at the bottom of the hole and a broad peripheral surface for reaming the side of the hole.

4. A rotary drill bit comprising a head, and a plurality of disk cutters slightly inclined from the horizontal and adapted to cut the whole bottom of the hole rotatably mounted on the forward end thereof; each of the said cutters having a forward milling and grinding face with a sharp marginal cutting edge and a relatively broad peripheral reaming surface adapted to make contact with the side of the hole.

5. A rotary drill bit comprising a head, and two almost but not quite horizontal disk cutters rotatably mounted on the forward end thereof; each of the said cutters having a lower milling and grinding face, a peripheral reaming surface arranged to make longitudinal contact with the side of the hole, and a sharp shearing edge at the intersection of the said lower face and the said peripheral surface.

6. A rotary drill bit comprising a head, and two oppositely disposed disk-shaped cutters on the lower end thereof; the said cutters being mounted on axes, which are inclined forwardly with respect to the longitudinal axis of the head so as to bring the forward advancing edges of the cutters in contact with the bottom of the hole, and the peripheral surfaces thereof in contact with the side of the hole.

7. In a rotary drill bit, the combination of a head, and two disk-shaped cutters rotatably mounted on the forward end thereof and inclined slightly from the horizontal to cut away the bottom of the hole; the said cutters having a cutting and grinding end face and a peripheral reaming surface, positioned to roll on the side of the hole and cause the rotation of said cutters.

8. In a rotary drill bit, the combination of a head, with almost but not quite horizontal disk-shaped cutters rotatably mounted on the lower end thereof; each of the said cutters having a forward sharp marginal cutting edge and a vertically disposed peripheral reaming surface.

9. In a rotary drill bit, the combination of a head, two nearly horizontal disk shaped cutters mounted on shaft supports that are inclined slightly from the vertical and journaled in lateral bosses on the said head, and a protecting cap secured to and encircling the said head and having relatively off-set portions adapted to cover the rear end of each of said axes in the manner and for the purpose described.

10. In a rotary drill bit, the combination of a head with broad faced nearly horizontal disk members journaled in the lower end thereof on axes that are slightly inclined outwardly with respect to the axis of the head and forwardly relative to the direction of rotation of the bit, for the purposes set forth.

11. In a rotary drill bit, the combination of a head, with nearly but not quite horizontal disk members rotatably mounted on the lower end thereof; the said members having lower cutting edges and toothed peripheral reaming surfaces arranged to operate in parallel relation to the longitudinal axis of the head.

12. In a rotary boring drill the combination of a drill head detachably secured to the end of a hollow drill stem, broad faced cutting members revolubly mounted on the said head on axes almost but not quite parallel to the longitudinal axis of the head and so disposed thereon that the outer sides of the said members bear against the side wall of the bore hole over substantially their entire width of face, said cutting members operative by the rolling of said head to cut a cylindrical hole to receive said head, means for supplying lubricant to the bearings on which the cutters revolve when the drill is in operation, and means for discharging a stream of flushing water into the end of the bore hole in which said cutters are operating.

13. In a rotary boring drill the combination of a hollow drill stem, a hollow drill head detachably mounted at the lower end of the said stem, a plurality of cutting members rotatably mounted on the drill head and adapted to simultaneously shear the material from the bottom of the hole by the action of the lower forward edges of the members and ream the material from the side of the hole by the action of the outermost portions of the peripheral surfaces, with means for conducting a stream of flushing water through the interior of the hollow drill head and discharging it in proximity to the said cutting members, and means for supplying lubricant from the interior chamber of the said hollow head to the bearings for the said cutting members.

14. In a rotary drill bit, a substantially horizontal, disk-shaped cutter having a toothed peripheral surface in parallelism with the longitudinal axis of the bit, said cutter being mounted on an upright axis inclined slightly forward at the upper end in the direction of rotation of the bit and a sharp cutting edge on the margin of the lower face of said cutter adapted to drill the whole bottom of the hole, and adapted to cut the entire bottom of a cylindrical hole.

15. In a rotary drill bit, a head having thereon disk-shaped cutters mounted almost but not quite horizontally on upright axes inclined slightly forward, and presenting the flat forward faces of said cutters in cutting and grinding contact with the lower end of the hole in the manner and for the purpose described.

16. A rotary boring drill comprising a cylindrical head and two disk-shaped cutters mounted on the forward face of said head, the diameter of each cutter being approximately half that of the head and each of said cutters presenting a flat forward cutting face to cut away the bottom of the hole and a toothed peripheral reaming surface contacting with the side of the hole for the entire width of said cutters whereby the cutters are rotated by the rolling of the peripheral surfaces on the side of the hole.

17. In a rotary boring drill, the combination of a head and cutters thereon, said cutters mounted on axes almost but not quite parallel with the longitudinal axis of the head and presenting a substantially flat cutting face in shearing and disintegrating contact with the bottom of the hole.

18. In a rotary boring drill, the combination of a hollow drill stem, a drill head thereon, two oppositely disposed cutting disks mounted on the lower end of said head inclined slightly from the horizontal and adapted to drill a cylindrical hole, a central oil chamber inside said drill stem and said head and extending longitudinally of said head to a point adjacent the base thereof, and a pipe for flushing water passing centrally through said chamber, threaded through the bottom of the same and issuing between said cutters.

In testimony whereof, I hereunto affix my signature this the 5th day of February, A. D. 1918.

FRANK L. O. WADSWORTH.